United States Patent [19]

Kunugihara et al.

[11] Patent Number: 4,671,858
[45] Date of Patent: Jun. 9, 1987

[54] METHOD FOR MAKING ANODE FOIL FOR AN ALUMINUM ELECTROLYTIC CAPACITOR

[75] Inventors: Hiromu Kunugihara; Ryoichi Shimatani, both of Kyoto; Satoru Kitamura, Uji; Kazuo Okamura; Nobuyoshi Kanzaki, both of Joyo, all of Japan

[73] Assignee: Matsushita Electric Industrial Co., Ltd., Kadoma, Japan

[21] Appl. No.: 744,489

[22] PCT Filed: Oct. 5, 1984

[86] PCT No.: PCT/JP84/00472

§ 371 Date: Jun. 5, 1985

§ 102(e) Date: Jun. 5, 1985

[87] PCT Pub. No.: WO85/01612

PCT Pub. Date: Apr. 11, 1985

[30] Foreign Application Priority Data

Oct. 6, 1983 [JP] Japan ................... 58-186030

[51] Int. Cl.$^4$ .............................................. C25F 3/04
[52] U.S. Cl. ............................................ 204/129.75
[58] Field of Search ................. 204/129.43, 129.75

[56] References Cited

U.S. PATENT DOCUMENTS

| | | | |
|---|---|---|---|
| 3,085,950 | 4/1963 | Thomas | 204/129.75 |
| 3,249,523 | 5/1966 | Post | 204/129.43 |
| 3,284,326 | 11/1966 | Martin | 204/129.75 |
| 3,520,788 | 7/1970 | Paehr | 204/129.75 |
| 4,140,599 | 2/1979 | Yamosaki | 204/129.43 |
| 4,484,252 | 11/1984 | Ruijgrok | 204/129.43 |

FOREIGN PATENT DOCUMENTS

| | | | |
|---|---|---|---|
| 51-142442 | 12/1976 | Japan | 204/129.43 |
| 715525 | 9/1954 | United Kingdom | 204/129.43 |

*Primary Examiner*—T. M. Tufariello
*Attorney, Agent, or Firm*—Cushman, Darby & Cushman

[57] ABSTRACT

The present invention relates, in an aluminum electrolytic capacitor using aluminum foil as its electrode, to a method for producing safely an anode foil having a high surface-area-enlarging factor at a low cost, by adding anions, which have oxide film-forming action over aluminum surface, to aqueous solution containing chloric ions, and in this solution taking the aluminum foil as an anode, a pulse current is applied between this and a counter electrode, thus while forming an oxide film over the surface, the aluminum foil is etched at the same time, and thereby the positive electrode foil having a high surface-area-enlarging factor is obtainable.

8 Claims, 3 Drawing Figures

METHOD FOR MAKING ANODE FOIL FOR AN ALUMINUM ELECTROLYTIC CAPACITOR

TECHNICAL FIELD

The present invention relates to a method for making anode foil for an aluminum electrolytic capacitor.

BACKGROUND ART

Hitherto, aluminum electrolytic capacitors of this kind have ordinarily been constituted by winding an insulating paper and an aluminum foil processed by electrolytic etching in an electrolytic solution containing chloric ion to enlarge its effective surface area.

The surface areal enlarging action of an electrode foil by the electrolytic etching is influenced by a number of factors, for example, etching current waveform, current density, kind of etching solution, concentration, temperature, and kind and concentration of additives, and furthermore, pre-etching process, inter-stage process, post-process, kind of aluminum raw foil, and so on.

Among them, the investigation concerning the current waveform has been carried out since long time before, and ordinarily, DC current, AC current, and pulse current are used in industry.

The etching method utilizing pulse current waveforms has also been investigated in various ways, and as the methods using pulse current waveforms in an electrolytic solution containing chloric ions, British Patent No. 1,169,234, Japanese unexamined published patent application No. Sho 57-132322, and others are known.

Also, as the method using pulse current waveforms in an electrolytic solution containing chloric ions and chromic acid ions as an additive, Japanese examined published patent application No. Sho 55-36280 is known.

In the method of adding chromic acid ions stated in the Japanese examined published patent application No. Sho 55-36280, there were drawbacks that the etching waste lye was not only harmful for human bodies but also its concentration in the waste lye was regulated by law to be 0.05 ppm or below and hence the pollution elimination process of this waste lye using such as the reduction-hydroxide-precipitation method or the ion-exchange method consumed labor and time, and brought danger, resulting in cost-increase.

In this method, due to the use of chromic acid ion having a high oxide film production action, those parts except initially produced corrosion holes are protected by the film, further production of those corrosion holes is difficult to occur and only those initially produced corrosion holes proceed deeper into the inside of the aluminum foil. As a result of this, the depth of the corrosion holes becomes $100\mu$–$150\mu$, and for those aluminum foils of the thickness less than $150\mu$ the strength against folding of the aluminum foil becomes weak, and hence it was not suited to its industrialization.

And, the used current densities being less than 0.5 $A/cm^2$, if it is attempted to increase the current density to improve the productivity, the etching formation becomes non-uniform, and the surface enlarging factor decreases, and then the etching time cannot be reduced, hence there was a drawback that there is a limitation to the improvement of the productivity.

DISCLOSURE OF THE INVENTION

The present invention is intended to solve such the drawbacks described above, and it purposes, by examining combustions of various factors, to offer an aluminum electrolytic capacitor using an aluminum etched foil which has a higher surface enlarging factor than conventional ones and is obtainable safely at a lower cost.

That is, the present invention is that, adding anions, which have an ability of forming oxide film of over an aluminum surface, to an aqueous solution of a solution temperature of 50° C.–100° C., and in this solution taking an aluminum foil as an anode, a pulse current of a frequency of 5 Hz–100 Hz and of a duty ratio of 40%–95% is applied between this and a counter electrode, thereby while forming an oxide film over the surface, the aluminum foil is etched at the same time.

By this configuration, by using an electrolytic solution containing no chromic acid ions, which is harmful in environmental pollution, and by adding an additive of oxalic acid ion or sulphuric acid ion, and forming an oxide film over the surface, the effect of the pulse current can be made higher than the prior arts, and thereby an electrode foil having a higher enlarging factor than those of etched foils by prior arts can be obtained.

BEST MODE FOR EMBODYING THE INVENTION

In the following, the explanation is given concerning embodiments of the present invention.

The present inventors started their investigation first with the aim to find out any effective additive other than the chromic acid ions stated in the aforementioned Japanese examined published patent application No. Sho 55-36280.

In consequence of the investigation on various chemicals, sulphuric acid ions and oxalic acid ions were found promising as the additives among those chemicals having oxide-film forming ability. (Refer to the Embodiment 1.)

Next, the investigation was started on the etching condition by which a higher enlarging factor can be attained at a higher current density than in the prior arts, to improve productivity.

The reason is that, by using a higher current density, a reduction of the etching time per unit area becomes possible, thereby an improvement of the productivity can be expected.

For this purpose, the present inventors tried to gradually increases the chromic acid ion concentration compared with the conventional condition, thereby the stabilization of chromic acid ion concentration in the neighborhood of the interface between the electrolytic solution and the electrode foil was attempted.

As a result of this, it was possible to find out a condition wherein, even when the electrolytic etching was performed with a current density of more than 1.5 times of the conventional condition, the electrolytic etching proceeded uniformly and a higher surface enlarging factor was obtained in a short time. (Refer to the Embodiment 2.)

In accordance with these investigations, using an aqueous solution containing chloric ions added with sulphuric acid ions or oxalic acid ions as an electrolytic solution, and by using a pulse current, it was possible to obtain a higher surface enlarging factor with a higher current density than in the prior arts.

Next, description is made on concrete embodiments.

(Embodiment 1)

Figure 1:
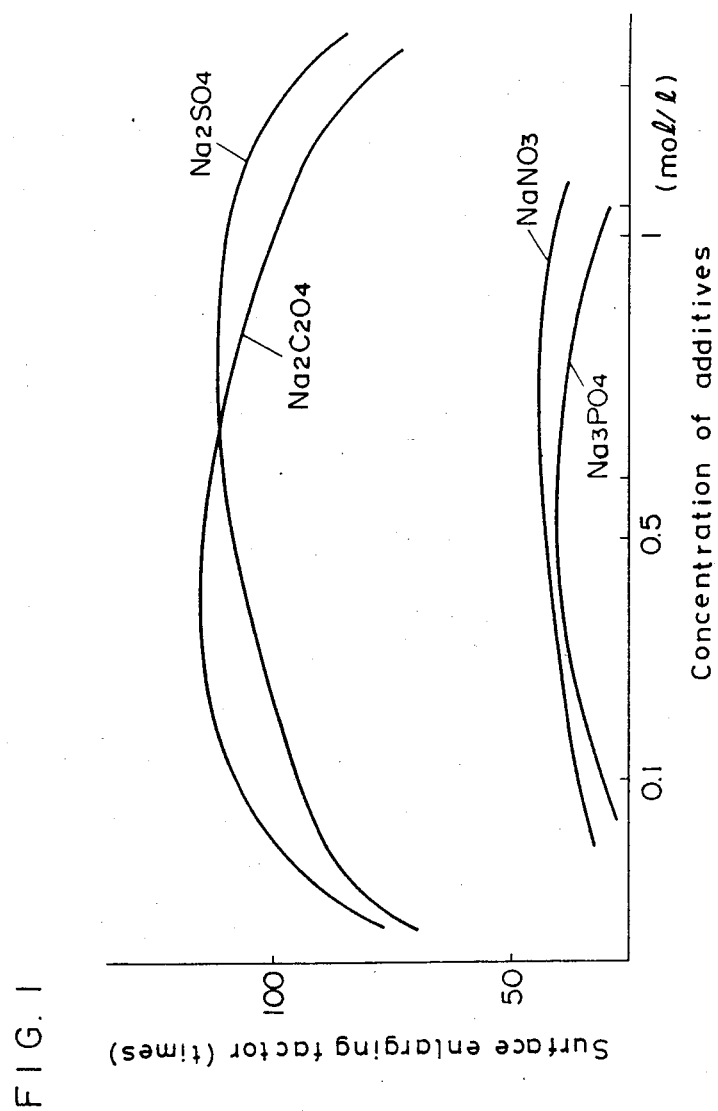
FIG. 1 is a characteristic graph showing the relation of the enlarging factor with respect to the kind and concentration of the additives.

In FIG. 1, data obtained when several additives were investigated are depicted. As the additives, adding respective sodium salts of (1) sulphuric acid ion, (2) oxalic acid ion, (3) phosphoric acid ion, and (4) nitric acid ion, the electrolytic etching was performed, and the surface enlarging factors were investigated. (The surface enlarging factor is the ratio of the static capacitances before and after an etching in a chemical processing at 50 V.)

Etching Condition:
Electrolytic Solution:
NaCl: 0.2 mol/l,
solution temperature: 90° C.,
current density: 0.2 A/cm$^2$
Current Waveform:
Frequency 50 Hz, waveform of a duty ratio (current-on time/current-on time+current-off time) of 80%, etching time of 5 minutes As is clear from this embodiment, it is understood that high enlarging factors are obtained by sulphuric acid ions and oxalic acid ions.

The reason is understood in a manner that both of them are chemicals utilized for forming alumite (alumilite) film, and alumite (alumilite) film gives a favorable effect for the proceeding of the etching.

(Embodiment 2)

Figure 2:
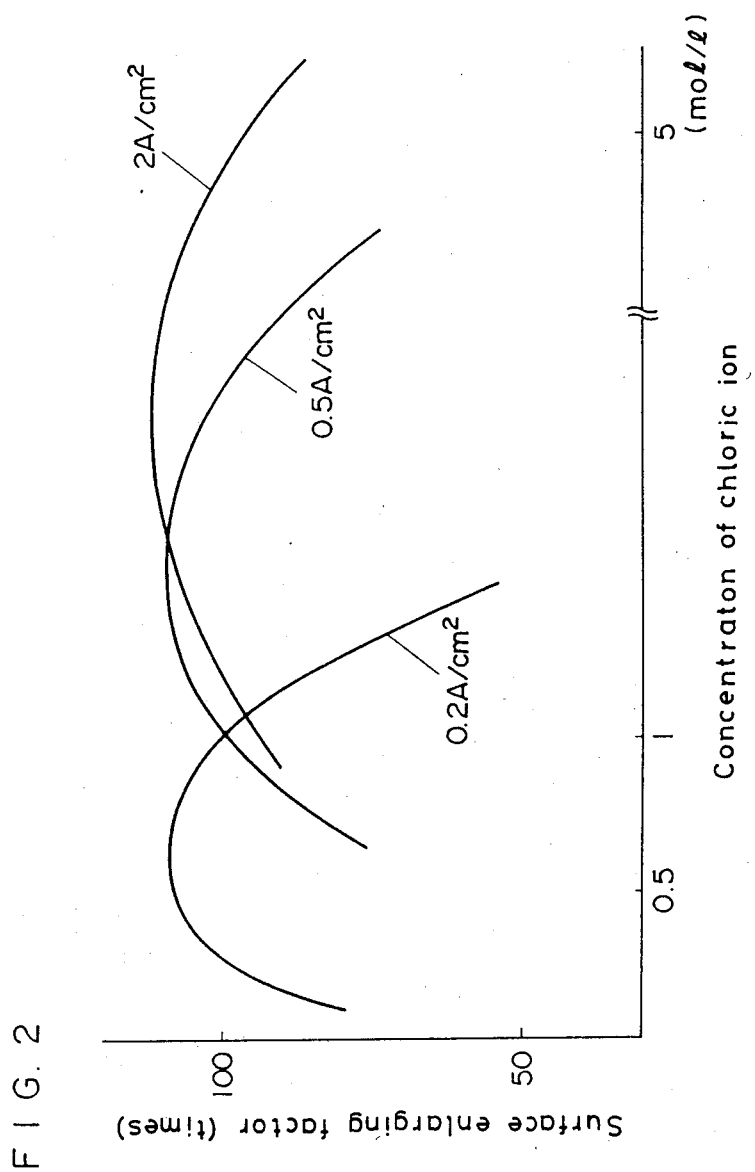
FIG. 2 is a characteristic graph showing the relation of the enlarging factor with respect to the chloric ion concentration and the current density.

Investigated result concerning the relation between the chloric ion concentration and the current density is shown in FIG. 2.

Electrolytic solution:
NaCl aqueous solution,
additive Na$_2$SO$_4$ 0.2 mol/l,
temperature: 90° C.,
current waveform: frequency 50 Hz, pulse current of a duty ratio of 80%, Since the amount of reduction by dissolution is determined by the electric charge, the etching time was determined so that the total flowing electric charge became 60 coulomb/cm$^2$.

As is clear from the graph, as the chloric ion concentration increases, the surface enlarging factor becomes high when the current density is high. That is, it was found that there was an interaction between the chloric ion concentration and the current density.

Consequently, by increasing the chloric ion concentration compared with the prior art, a higher surface enlarging factor was obtained even at a high current density, hence the productivity improvement was attained.

(Embodiment 3)

Figure 3:
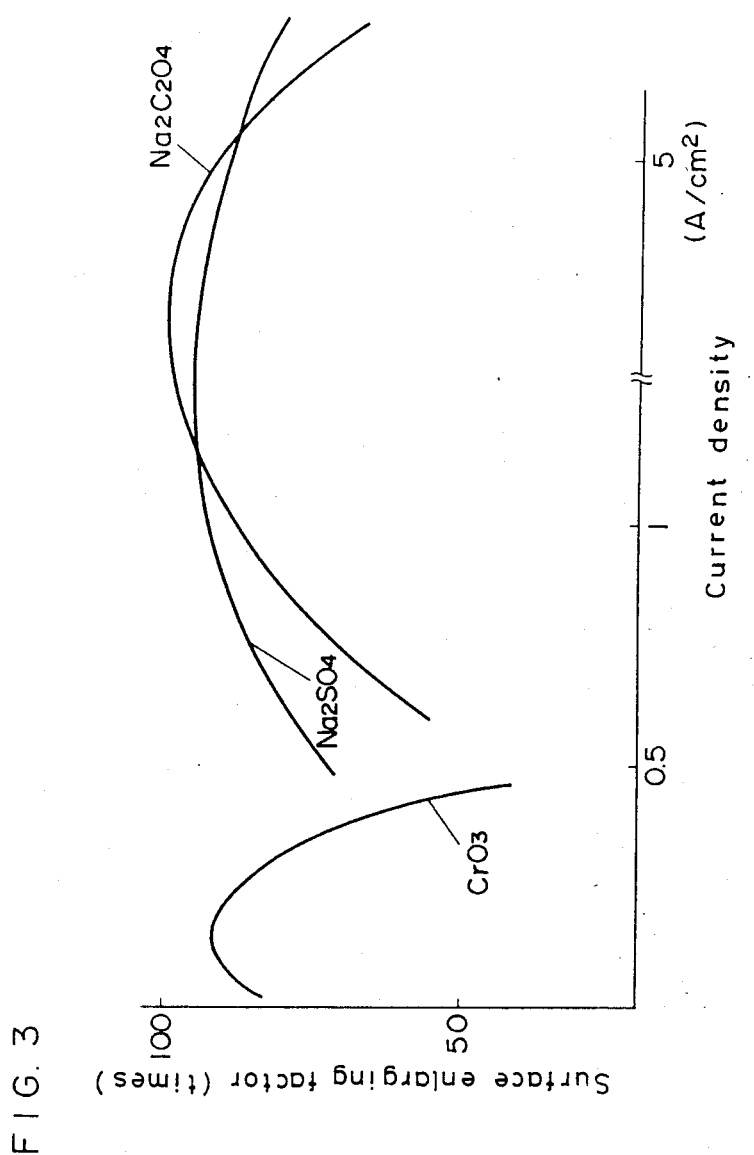
FIG. 3 is a characteristic graph showing the difference of the current densities between the prior arts and the embodiment of the present invention.

For those conditions obtained in the Embodiment 1 and the Embodiment 2, comparison investigation was made with the enlarging factor for the conventional etching condition. The result is shown in FIG. 3.

The prior art mentioned here is a method based on the Japanese examined published patent application No. Sho 55-36280.

Prior Art:
Etching solution: NaCl, 0.1 mol/l
Additive: CrO$_3$, 0.1 mol/l
Solution temperature: 90° C.
Current waveform: duty ratio 80%, frequency 50 Hz Condition embodied as the present invention is as follows.
Etching solution: NaCl, 1 mol/l
Additive: (1) Na$_2$SO$_4$ 0.2 mol/l
(2) Na$_2$C$_2$O$_4$ ,0.2 mol/l Solution temperature and current waveform are the same as the prior art.

(Etching time was determined in a manner that the total flowing electric charge became 60 coulomb/cm$^2$.)

As is clear from FIG. 3, taking the pulse current waveform as the base, by investigating the chloric ion concentration, kind and concentration of the additives and the current density, a combination for obtaining a higher surface enlarging factor with a higher current density compared with the prior art was obtained.

(Embodiment 4)

As a Prior Art 1, utilizing NaCl 2 mol/l aqueous solution, and applying a DC current of 1 A/cm$^2$, the etching was performed at 90° C. for 1 minute.

As a Prior Art 2, in NaCl 2 mol/l and Na$_2$SO$_4$ mol/l aqueous solution a DC current of 1 A/cm$^2$ was applied, and the etching was performed at 90° C. for 1 minute.

As a Prior Art 3, in NaCl 2 mol/l aqueous solution a pulse current (duty ratio 80%, frequency 100 Hz) of 1 A/cm$^2$ (average value) was applied and the etching was performed at 90° C. for 1 minute.

Next, as an example of the present invention, in NaCl 2 mol/l Na$_2$SO$_4$ 0.5 mol/l aqueous solution, a pulse current (duty ratio 80%, frequency 100 Hz) of 1 A/cm$^2$ (average value) was applied and the etching was performed at 90° C. for 1 minute.

Next, as an example of the present invention, in NaCl2 mol/l Na$_2$SO$_4$ 0.5 mol/l aqueous solution, a pulse current (duty ratio 80%, frequency 100 Hz) of 1 A/cm$^2$ (average value) was applied and the etching was performed at 90° C. for 1 minute.

Enlarging factors of the electrode foils of these four kinds processed as described above and their increasing factors with respect to the Prior Art 1 are shown in the Table.

TABLE

| Method | Electrolytic solution | Wave form | Enlarging factor | Increasing factor |
| --- | --- | --- | --- | --- |
| Prior Art 1 | NaCl 2 mol/l | DC | 50 | — |
| Prior Art 2 | NaCl 2 mol/l & Na$_2$SO$_4$ 0.5 mol/l | DC | 60 | 20% increase |
| Prior Art 3 | NaCl 2 mol/l | pulse | 60 | 20 increase |
| Example of the present invention | NaCl 2 mol/l & Na$_2$SO$_4$ 0.5 mol/l | pulse | 120 | 140% increase |

(Prior Art 3 is the method of Japanese unexamined published patent application No.. Sho 57-132322.)

Comparing the Prior Art 1 and the Prior Art 2, in the case of DC current, it is understood that, by adding sulphuric acid ions to chloric ions in the electrolytic solution, an increase of 20% in the surface enlarging factor is obtained. This fact is well known, and as its reason, by the addition of sulphuric acid, a gradient takes place in the concentration of chloric ions in the neighborhood of the etching interface, and it produces a change in the corrosion speed. As a result of this, microscopic irregularities are produced over the surface, and they are considered to serve to increase the surface enlarging factor.

And, comparing the Prior Art 1 and the Prior Art 3, by changing the current from DC to pulse, an increase of 20% in the surface enlarging factor was obtained. The reason of this is considered to be that at a time when the pulse current is turned off, those gases such as hydrogen and other corrosion products in corrosion holes are swept out, and fresh electrolytic solution enters into those holes, then the electrolytic etching proceeds uniformly during the current-on period.

Furthermore, in the present embodiment, utilizing the electrolytic solution in which sulphuric acid ions were added to chloric ions, and the pulse current was applied thereto, an increase of 140%, which was by far higher than the effect expected from the Prior Arts 1 to 3, was obtained. This fact shows that the effect of the addition of sulphuric acid ions is far higher in the pulse current than in the DC current, and it also shows that the effect of the pulse current can be increased further by utilizing the electrolytic solution added by sulphuric acid ions.

The reason for the above is that since the pulse current is a repetition of current-on and current-off, by the addition of sulphuric acid ions of oxalic acid ions, which have a film forming ability, to the electrolytic solution, suffering of an attack by chloric ions can be excluded during the period of current-off, thereby to enable forming of a film uniformly over the surface of the aluminum foil during the period of current-off.

By the fact described above, dissolution and the film formation are repeated intermittently. As a result of this, even after the etching proceeds and the corrosion holes become deep and narrow, because the surface if covered by the film, the corrosion holes are resistive against their collapse, then deeper corrosion holes can be obtained, and it is considered that it brings favorable effect to the surface areal enlargement.

Hereupon, in the present invention, although the table salt was utilized as the material containing the chloric ion, hydrochloric acid can also give the similar effect. As the additives, sodium oxalate, potassium sulphate, and potassium oxalate can also give the similar effect, though sodium sulphate was utilized.

POSSIBLE UTILITY IN INDUSTRY

As has been described above, by applying the pulse current in an electrolytic solution containing chloric ion and anions of sulphuric acid ion or oxalic acid ion, which have the oxide film forming action, an electrode foil of a high enlarging factor can be obtained safely and in a shorter time, thereby stable productions of electrode foils for aluminum electrolytic capacitors as well as the cost reduction by the productivity improvement can be obtained.

Owing to the above, it is possible to obtain an effect that the cost reduction of aluminum electrolytic capacitors is attained.

We claim:

1. Method for making anode foil for an aluminum electrolytic capacitor characterized in that sulfuric acid ions or oxalic acid ions having oxide film forming action over an aluminum surface are added to an aqueous solution containing chloric ions, a pulse current of a frequency of 5 Hz–100 Hz and a duty ratio of 40%–95% is let to flow between an alumnium foil and a counter electrode with taking the aluminum foil as an anode, thereby while forming an oxide film over its surfaces at the same time, electrolytically etching the aluminum foil.

2. Method for making anode foil for an aluminum electrolytic capacitor in accordance with claim 1 characterized in that, concentration of the anions is 0.1 mol/l–1 mol/l.

3. Method for making anode foil for an aluminum electrolytic capacitor in accordance with claim 1 characterized in that, concentration of the chloric ions is 1.0 mol/l–4.5 mol/l and the current density is 1–5 A/cm$^2$.

4. Method for making anode foil for an aluminum electrolytic capacitor in accordance with claim 1 characterized in that, either one of hydrochloric acid or table salt or both of them are used as the chloric ions.

5. Method for making anode foil for an aluminum electrolytic capacitor in accordance with claim 1 characterized in that, as the pulse current, a current waveform wherein potential with respect to the counter electrode of the aluminum foil is positive or zero is used.

6. Method for making anode foil for an aluminum electrolytic capacitor in accordance with claim 1 characterized in that, as the pulse current, a current waveform wherein potential with respect to the counter electrode of the aluminum foil is positive or negative is used.

7. Method for making anode foil for an aluminum electrolytic capacitor in accordance with claim 1 characterized in that, the pulse current is such that its positive current density is 1–5 A/cm$^2$, its negative current density is 0.1–1 A/cm$^2$, its frequency is 5–100 Hz, and its duty ratio is 40–95%.

8. Method for making anode foil for an aluminum electrolytic capacitor in accordance with claim 1 characterized in that, the solution temperature of the aqueous solution containing chloric ions is 50° C.–100° C.

* * * * *